United States Patent [19]

Stearns, Jr.

[11] Patent Number: 4,720,059
[45] Date of Patent: Jan. 19, 1988

[54] HIGH SPEED HELICOPTER

[76] Inventor: Hoyt A. Stearns, Jr., 4131 E. Cannon Dr., Phoenix, Ariz. 85028

[21] Appl. No.: 948,022

[22] Filed: Dec. 31, 1986

[51] Int. Cl.$^4$ ............................................. B64C 27/06
[52] U.S. Cl. ................ 244/17.11; 244/17.25; 244/17.27; 416/148
[58] Field of Search ............... 244/17.11, 17.23, 17.25, 244/17.27; 416/148, 98, 102, 123, 158

[56] References Cited

U.S. PATENT DOCUMENTS

| | | | |
|---|---|---|---|
| 2,030,078 | 2/1936 | Vaughn | 244/19 |
| 2,163,728 | 6/1939 | Dyer | 244/18 |
| 2,514,205 | 7/1950 | McDonald | 244/17.11 |
| 2,514,206 | 7/1950 | Perry | 244/17.11 |
| 2,535,164 | 12/1950 | Seibel | 244/17.11 |
| 2,626,766 | 1/1953 | McDonald | 244/17.11 |
| 2,724,446 | 11/1955 | Hill | 170/160.26 |
| 2,886,261 | 5/1959 | Robert | 244/17.25 |
| 3,182,931 | 5/1965 | Mil | 244/17.17 |
| 3,921,939 | 11/1975 | Garfinkle | 244/17.25 |

FOREIGN PATENT DOCUMENTS

| | | | |
|---|---|---|---|
| 712878 | 10/1941 | Fed. Rep. of Germany | 244/17.23 |
| 470757 | 8/1937 | United Kingdom | 416/148 |
| 662752 | 12/1951 | United Kingdom | 416/148 |
| 755629 | 1/1955 | United Kingdom | 244/17.11 |
| 2090214 | 7/1982 | United Kingdom | 244/17.25 |

*Primary Examiner*—Galen Barefoot
*Attorney, Agent, or Firm*—LaValle D. Ptak

[57] ABSTRACT

A high speed helicopter, ideally suited for use with rotors which are tip propelled, has an offset flapping hub mounted on a tiltable mast which is located a substantial distance off to the retreading blade side of the fuselage of the helicopter. This causes the fuselage to be located completely under the advancing blades. Individual pitch control motors individually vary the pitch of the rotor blades to control the feathering angle as a function of the angular position so that lift is obtained from the advancing and laterally moving blades only.

15 Claims, 5 Drawing Figures

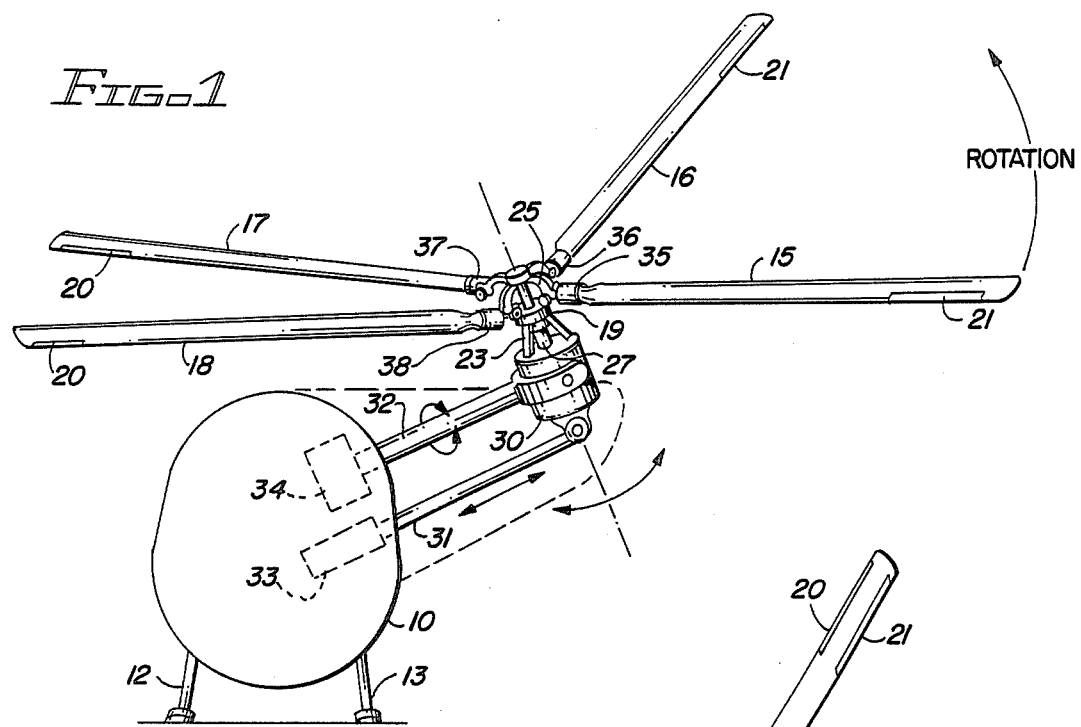
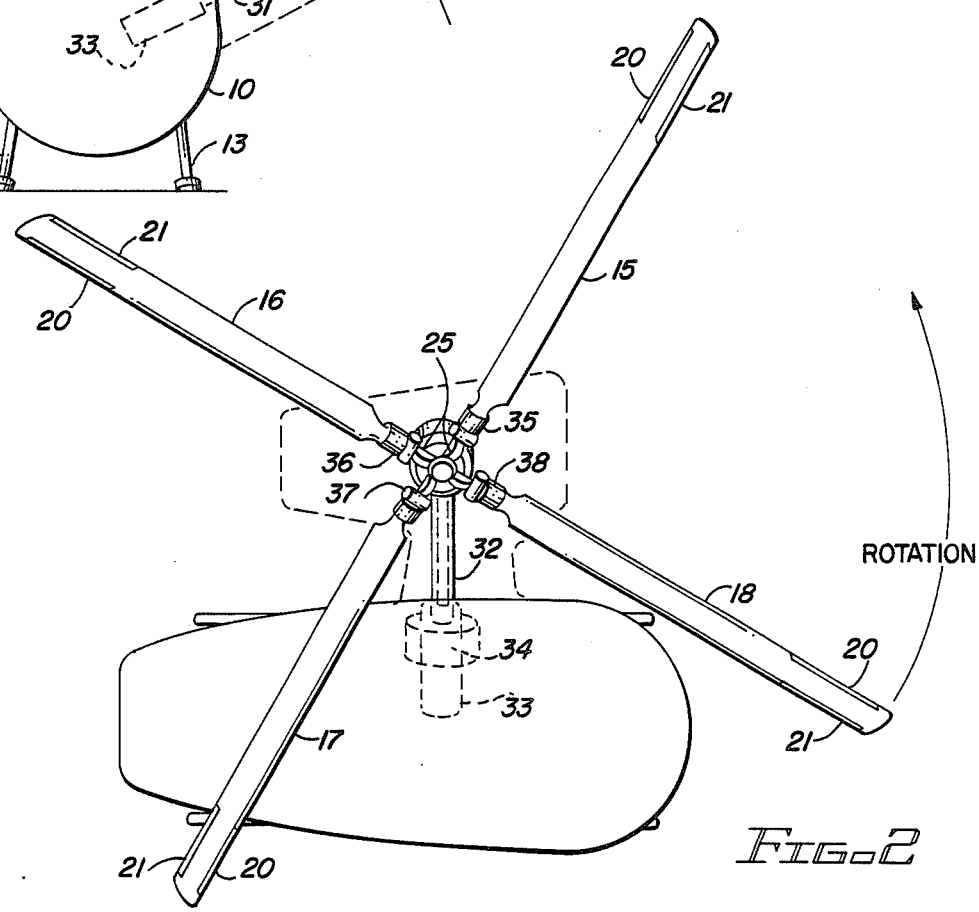
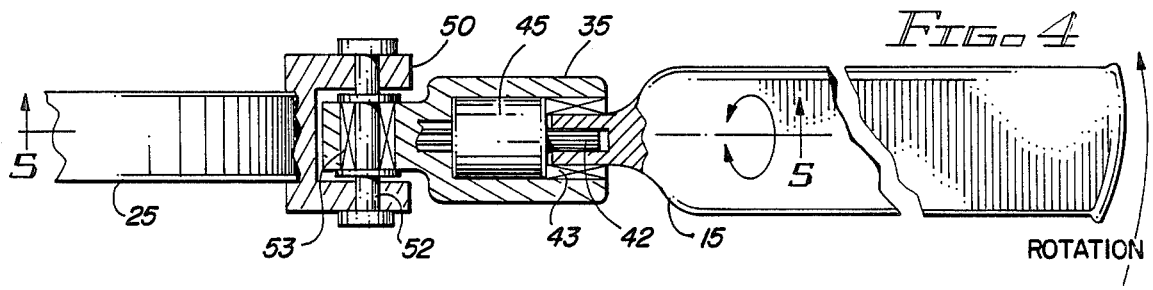

HIGH SPEED HELICOPTER

RELATED APPLICATION

This application is related to applicant's co-pending application, Ser. No. 699,460 filed Feb. 7, 1985 now U.S. Pat. No. 4,702,437.

BACKGROUND OF THE INVENTION

This invention relates to helicopters, and more specifically to helicopters for achieving high speed flight.

In conventional helicopters, lift propulsion and control are provided by one or more rotating airfoils or rotors blades. The rotational plane of the rotors blades is substantially horizontal. In forward flight, the velocity of air flowing over the rotor airfoils differs between the left and right sides of the helicopter; because the airfoils on one side are advancing in the direction of flight and on the other side the airfoils are retreating. Consequently, the maximum air speed of the advancing rotor blade at its tip is the sum of the tip speed due to rotation and the forward speed of the helicopter. Similarly, the minimum speed of the retreating rotor blade on the other side of the helicopter is the difference between the tip speed of rotation and the forward speed of the helicopter. Consequently, the air speed of the advancing rotor blade is greater than that of the retreating rotor blade by twice the forward air speed of the helicopter.

This difference in the velocity of air flow over the advancing and retreating rotor blades is the factor which limits the maximum air speed of a helicopter, primarily because, as the helicopter's forward air speed increases, the air flow over the retreating airfoil or rotor blade becomes too low to support the required weight; and the retreating airfoil stalls. On the advancing side, the blade tip approaches supersonic speed; and the resulting compression of the air against the blade (compressibility effect) can cause blade flutter and greatly increased power requirements as well as creating unstable operating conditions of the helicopter. As a consequence, the maximum forward speed of a conventional helicopter is limited because of the effects of retreating blade stall and advancing blade compressibility effects. Without auxiliary lift or propulsion devices in the helicopter, a practical maximum speed for a conventional helicopter is approximately 250 miles per hour.

Another problem which is encountered in conventional helicopters, and which is increasingly noticeable at high speed, is that the helicopter tends to roll to one side, the retreating side, due to unequal lift of the rotor blades on the advancing and retreating sides. To compensate for this tendency and to maintain stable flight at relatively high forward speeds, attempts have been made in the past to compensate for this tendency by equalizing the lift on opposite sides of the rotor hub (that is on the advancing and retreating sides). To some extent this can be accomplished by raising the pitch of the retreating blades while simultaneously lowering the pitch of the advancing blades with a swash plate mechanism. A problem arises, however, if the blades are already operating at pitch angles near their stall limits for hovering efficiency. In this situation, the procedure of increasing the pitch of the retreating blades can result in the stalling of the retreating blades significantly decreasing their lift capability instead of increasing the lift. Compromises therefore must be made between the rotor efficiency of the helicopter and the rotational speed of the rotor. At higher speeds, the rotor blades can operate at a lower average pitch angle to accommodate the asymmetry of lift.

In the past, three methods for avoiding the stalling of the retreating rotor blades in high speed forward flight have been tried. One of these methods is the "advancing blade concept" which consists of the utilization of two coaxial counterrotating rotor hubs. Rotor airfoils or rotor blades then are mounted rigidly on these respective hubs so that there are always advancing blades on both sides of the helicopter. As a consequence, the retreating blades do not need to provide any lift to keep the helicopter in balance. Helicopters employing this advancing blade concept have been constructed and successfully operated, but these helicopters are very expensive. In addition, the blades must be extremely rigid because large moments must be transferred across the two counterrotating hubs.

A second method is an "X-wing aircraft". This type of aircraft has a substantially horizontally mounted multiple blade rotor which is stopped in flight. Propulsion then is achieved by a conventional propeller to either pull or push the aircraft through the air, and the rotor blades become the fixed wings of the aircraft. Theoretically, an aircraft of this type would be the ideal aircraft since the rotor could be rotated to provide lift, but is not required to provide forward propulsion. In practice, however, an aircraft of this type is also very expensive; because the horizontal rotor blades must be rigid enough to support the aircraft without the benefit of centrifugal force. This means that the blades must be large and rigid. In addition, the control system and the hub are very complex. Consequently, such aircraft have not achieved any degreee of practical acceptance.

A third method for avoiding the retreating blade stall of helicopter airfoils or rotors is the "tilt rotor" type of aircraft. This aircraft essentially comprises a conventional airplane in which the two wing-mounted propellors are rotated, so that the axis of rotation is vertical for take off. The propellors then are slowly rotated into a conventional horizontal position for high speed flight. The tilt rotor, however, also is expensive due to mechanical complexity and the necessity of cross-linking the two propellors in case of engine failure, since a failure of one of the two propellors could be catastrophic.

Some systems have been developed in the past to compensate for the difference in lift between the advancing and retreating blades of a helicopter to minimize or offset the tendency of this lift differential to cause the helicopter to roll over toward the retreating blade side. One system, directed to a resolution of this problem, is disclosed in the patent to Garfinkle #3,921,939. In Garfinkle, the single rotor hub is mounted on a pair of transverse slide rods; so that the lateral position of the hub may be moved toward the retreating blade side. This shifts the center of lift of the rotor system toward the retreating blade side of the helicopter fuselage. There is no speed advantage which is achieved by this shifting, however, because the hub itself does not create any moment on the shaft of rotation. It is desirable to provide a helicopter or rotary wing aircraft capable of attaining flight speeds or air speeds substantially higher than have been attainable by such aircraft in the past. In addition, it is desirable to provide a high speed helicopter in which the retreating blades are unloaded while maintaining control of all six degrees of freedom of the helicopter (roll, pitch, yaw, up-down, left-right, fore-aft) by using a combination of forces and moments created solely from a single main multiple blade rotor.

SUMMARY OF THE INVENTION

It is an object of this invention to provide an improved high speed helicopter.

It is another object of this invention to provide an improved high speed helicopter which does not require lift from the retreating blades.

It is an additional object of this invention to provide a modified, advancing blade concept helicopter using only a single rotor.

It is a further object of this invention to provide an improved control system for a helicopter.

It is yet another object of this invention to provide an offset rotor hub mounting for a helicopter for improving the high speed flight characteristics of the helicopter.

In accordance with the preferred embodiment of this invention, a helicopter has a fuselage and a single rotor hub to which a plurality of rotor blades are attached. The hub is mounted on a mast which is attached to the fuselage off to or beyond the retreating blade side of the fuselage. The hub is an offset flapping hub; and the pitch of each of the rotor blades is cyclicly varied as a function of the angular position of the blades; so that the advancing blades and laterally moving blades provide the lift and the retreating blades are not required to provide lift during forward high speed flight.

BRIEF DESCRIPTION OF THE DRAWINGS

FIG. 1 is a front perspective view of a preferred embodiment of the invention;

FIG. 2 is a top view of the embodiment shown in FIG. 1;

FIGS. 4 and 5 show details of a portion of the structure utilized in the preferred embodiment shown in FIGS. 1, 2, and 3.

DETAILED DESCRIPTION

Figure 3:
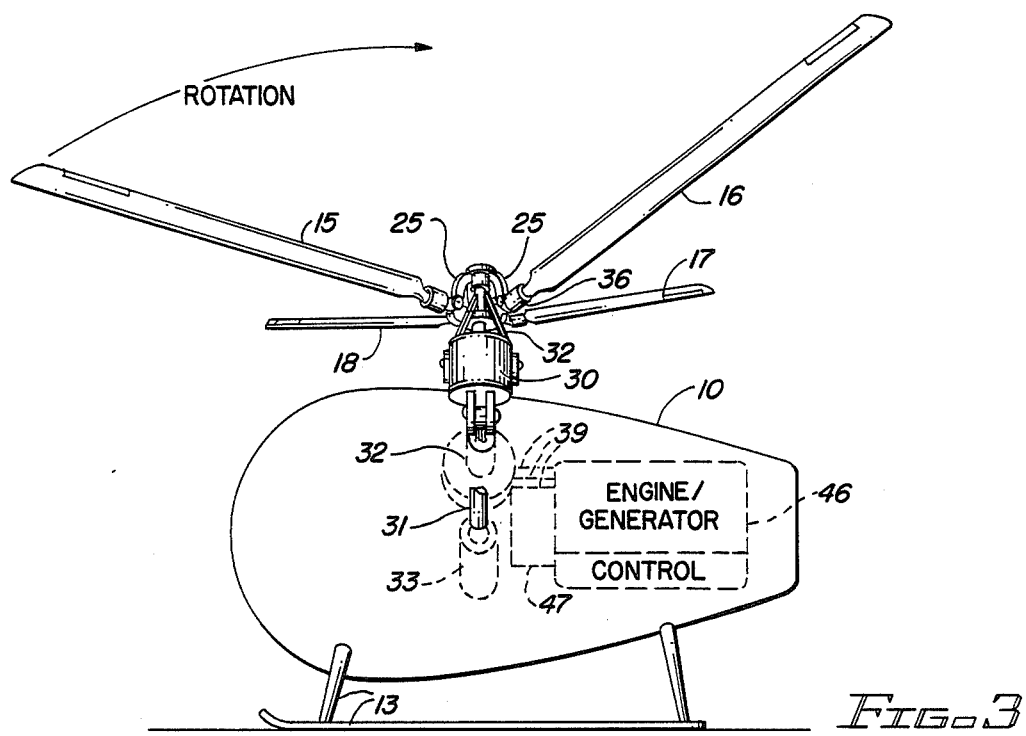
FIG. 3 is a side view of the embodiment shown in FIG. 1.

Reference now should be made to the drawings in which the same reference numbers are used throughout the different figures to designate the same or similar components. FIGS. 1, 2, and 3 show front, top, and side views of a high speed helicopter constructed in accordance with a preferred embodiment of this invention. As is readily apparent from an examination of these figures, the overall structure of the helicopter differs significantly from standard helicopter structures. In standard helicopters, the rotor or rotors are mounted directly above the fuselage of the helicopter. In most cases, this mounting is centered over the fuselage or is slightly shifted by a relatively minor amount to the retreating blade side of the helicopter, such as in the helicopter of the Garfinkle U.S. Pat. No. 3,921,939, discussed above. In contrast to this standard conventional configuration, the helicopter which is illustrated in the preferred embodiment of FIGS. 1, 2, and 3 has the rotor hub 19 to which the rotor blades are attached mounted wholly off to the side of the fuselage 10 a substantial distance on the retreating blade side of the fuselage. A perpendicular line drawn through the hub center does not intersect any part of the fuselage 10, as is clearly apparent in FIGS. 1 and 2.

As illustrated, the fuselage 10 has a pair of landing skids 12 and 13 attached to its underside. Four equiangularly spaced rotor blades or airfoils 15, 16, 17, and 18 are mounted on a rotor hub 19 of the offset flapping hinge type. Ideally, propulsion for the helicopter of FIGS. 1 through 3 is of the tip propelled type and ideally is provided by internally mounted cross-flow fans of the type disclosed in applicant's above identified co-pending application. Consequently, air is drawn in through the leading edge slots 20 and is exhausted under pressure from the trailing edge slots 21 on each of the blades 15 through 18 to provide rotation in the direction of the arrows shown in FIGS. 1 through 3. The specification of applicant's co-pending application Ser. No. 699,460 is incorporated herein by reference so that details of this propulsion system are not provided here. Other types of tip driven propulsion systems also could be used if desired.

The hub 19 itself is mounted on a mast 23 supported on a housing 30 which is in turn pivotally supported on a gimbel which permits tilting of the housing 30, and thus the mast 23, from left-to-right (side-to-side) by means of a control rod 31 activated by a hydraulic system 33 and from front-to-back (fore-aft) by rotation of a control rod 32, the rotational position of which is controlled by a suitable reversible hydraulic or electric drive mechanism 34. It is readily apparent from an examination of FIG. 1 that the composite movement of the rods 31 and 32 in accordance with the arrows illustrated in FIG. 1 provide significant control of the plane of rotation of the rotor hub to which the blades 15 through 18 are attached.

The root end or hub ends of the rotor blades 15 through 18 are rotatably connected, respectively, to housings 35 through 38 in which individual electric pitch control motors are mounted for individually adjusting the pitch of each of the blades 15 through 18.

In all current conventional helicopters, control is achieved either by tilting the main rotor shaft or, more commonly by the use of a swach plate. These control systems are designed to tilt the tip plane path of the rotor blades to any desired angle within predetermined parameters. This tilting is accomplished by cyclically controlling the pitch of the rotor blades with a once per revolution sinusoidal pitch variation, which aerodynamically causes the tip plane to become parallel with the swash plate or perpendicular to the shaft, in the case of shaft tilt control. Once the tip plane of the rotor blades is parallel to the swash plate, there is no more cyclic variation on the blades until the tip plane is changed. In the case of an offset flapping hinge hub of the type used in the embodiment of FIGS. 1 through 3, if the tip plane is not perpendicular to the shaft, then the fixed shaft tends to become perpendicular to the tip plane due to the centrifugal force of the blades.

Flapping hinge hub helicopter rotors have the blades mounted such that they are free to pivot up and down on hinges placed some distance out from the center of rotation. A rotor of this type can, by aerodynamic forces, be made to rotate such that the plane described by the rotor blade tips is tilted with respect to the plane of rotation of the hub (for example see the patent to McDonald U.S. Pat. No. 2,626,766). In such cases, a large moment is applied to the hub which tends to bring the two planes parallel. This moment is due to the centrifugal force of the blades, and the effect is used to provide some control in most modern helicopters. It should be noted that this effect does not occur in two bladed teetering hub rotor helicopters (such as disclosed in the Garfinkle U.S. Pat. No. 3,921,939). Consequently, at least three blades must be employed, and, as illustrated in FIGS. 1 through 3, a four bladed helicopter with the blades spaced 90° apart, is considered to be ideal.

In the helicopter of FIGS. 1 through 3, the retreating blades (for example blades 15 and 16 in the positions illustrated in FIGS. 1 through 3) are unloaded and supply no lift, while the advancing and laterally moving blades (blades 17 and 18 of FIGS. 1 through 3) provide all of the lift and propulsion forces for moving the helicopter fuselage 10. As is readily apparent from FIGS. 1 through 3, the hub 19 is mounted on the mechanism described; so that the rotational axis of the hub 19 may be tilted a substantial amount in any direction (right-left, fore-aft). The hub 19 is connected mechanically through a shaft 27 (which rotates with the hub 19) to an electrical generator/motor mounted just under the hub in the housing 30. This generator/motor may be of the type disclosed in co-pending application Ser. No. 699,460 and is utilized to perform the yaw control functions described in detail in such co-pending application.

Figure 5:
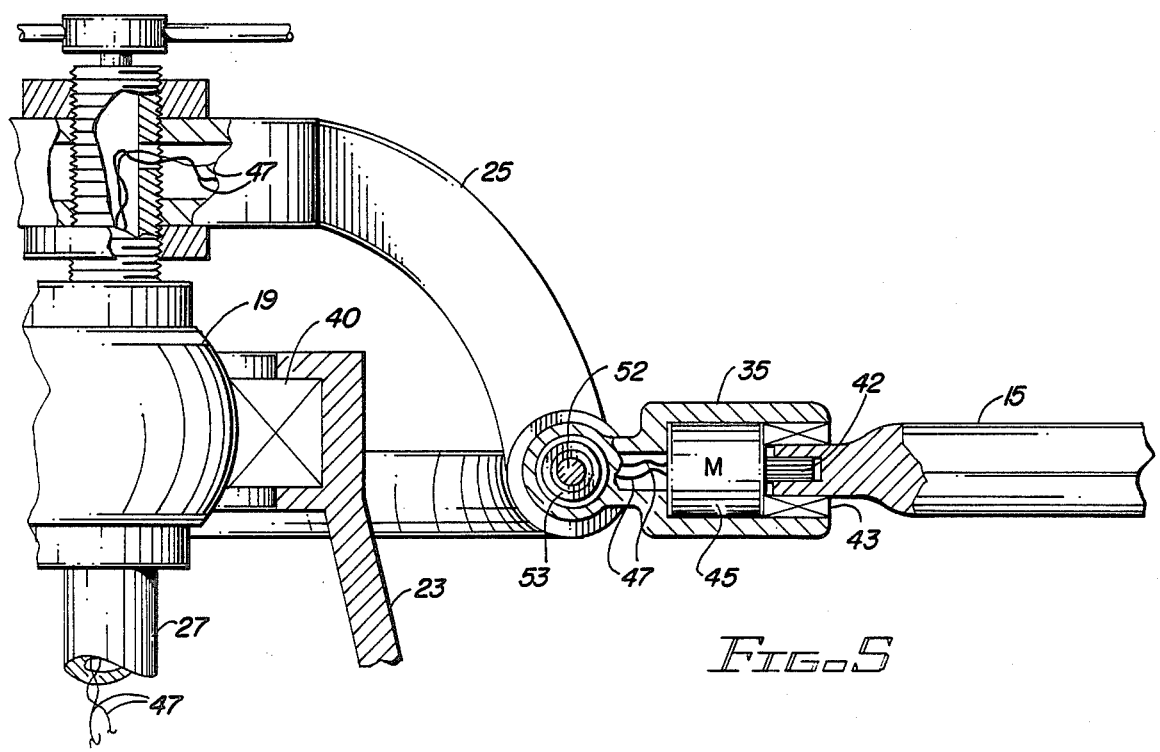

The path of the tips of each of the blades 15 through 18 is controlled independently of each of the other blades by means of individual feathering torque motors or pitch control motors 45, shown in FIGS. 4 and 5; and the tip path of the blades does not have to be a circle in a plane. In other words, the feathering excitation of the blades can be any function, not necessarily sinusoidal; and the tip paths need not bear any special relationship to the rotational plane of the hub 19.

By controlling the angle of the plane of rotation of the hub 19 with respect to the fuselage 10, the torque extracted by or added to the shaft 27 by the hub mounted motor/generator and the feathering function of each blade, (that is, the changes in the pitch angle as the blades 15 through 18 rotate), any desired force and moment may be applied to the helicopter thus making it completely controllable in all 6 degrees of freedom (roll, pitch, yaw, up-down, left-right, fore-aft).

With the hub 19 mounted off to the left side of the helicopter (for counter-clockwise rotation of the blades, as viewed from the top in FIG. 2), all of the force used to lift and propel the helicopter also is applied to the fuselage 10 on the left side, since the single rotor system, comprising the rotor blades 15 through 18, is the only propulsive and lifting device for the machine. Since all forces must balance for the helicopter to be in equilibrium, the drag and weight of the helicopter must match the lift and thrust of the rotor. The drag force, however, is centered on the fuselage 10, and the weight is primarily in the fuselage 10. Without correcting moments, the fuselage 10 would fall down to hang under the hub 19 at an unusual angle, and the drag would tend to weathervane the fuselage 10 to the rear and blow the fuselage up somewhat, since the rotor is normally located above the fuselage.

Considering these forces in conjunction with the structure of the helicopter shown in FIGS. 1 through 3, it is apparent that substantial moments are required to counteract the effects of the misaligned forces. These moments are applied with a combination of tilt of the hub 19, tip path control of the paths taken by the tips of each of the rotor blades 15 through 18, and hub shaft torque on the shaft 27 which rotates with the hub 19. To prevent the fuselage 10 from falling laterally down under the hub to the left side of the fuselage 10, the hub 19 is tilted to the right, as seen most clearly in FIG. 1; and the blade tip path of the rotor blades 15 through 18 is adjusted to apply an appropriate rolling moment from the centrifugal force of the blades.

To prevent the fuselage 10 from weathervaning to the rear, a combination of forward hub tilt, applied through the control shaft 32, and torque extracted from the rotor by the generator coupled to the shaft 19 in the housing 30 is used. Consequently, any direction and intensity of moment may be created by using a composite of these control methods.

As mentioned previously, all of the lift and propulsion forces are generated from the blade system comprising the rotor blades 15 through 18. The individual pitch of each of the blades 15 through 18 is adjusted as the blades move around, so that the center of lift of the rotor is over the center of gravity of the helicopter. Since the helicopter, is in effect, hanging under the advancing blades (for example blades 17 and 18 in the position illustrated in FIGS. 1 through 3), only the advancing and laterally moving blades provide lift.

The retreating blade pitch is adjusted for minimum drag only, since the retreating blades (for example blades 15 and 16 in the position shown in FIGS. 1 through 3) supply no lift. In fact, in high speed flight, the retreating blades have reverse air flow over them. Consequently, the retreating blades are each rotated by the pitch control motors 45 to have substantially no pitch. The pitch is increased on a blade as it crosses over the rear of the helicopter and reaches a maximum before becoming perpendicular to the longitudinal axis of the fuselage. The pitch then is reduced again as each of the blades finishes the lateral rotation across the front of the helicopter and commences the retreating movement.

The result of this operation is to cause the tip path of each of the rotor blades 15 through 18 to typically assume the configuration of a warped circle. The retreating blades approach being parallel to the plane of the hub 19 since there are no aerodynamic forces on them, although flapping resonance causes them to "cone down".

The advancing blades are substantially coned upward with respect to the hub 19 due to lift that is applied starting as the blade crosses over the rear. Since the bub 19 is titled toward the right side of the fuselage 10, however, the position assumed by the advancing blades as they pass over the fuselage 10 of the helicopter is essentially horizontal. Thus, the path followed by the blades is of a generally horizontal circle over the fuselage 10 with the circle being bent upwardly on the retreating blade side where the blades 15 through 18 move in the plane of the hub 19. The resulting force moments hold the fuselage in the generally perpendicular configuration illustrated in FIG. 1. In order to keep the hub size small, by reducing the offset hinge offset, springs in the flapping hinges may be employed.

As the helicopter speeds up, the RPM of the rotor hub 19 may be slowed down to keep the advancing blade tip speed subsonic. This may be done until the available centrifugal force from the blades is no longer adequate to create the necessary control moments.

The manner in which the individual pitch of each of the blades 15 through 18 is controlled is illustrated in conjunction with the blade 15 in greater detail in FIGS. 4 and 5. These figures show a portion of the mast 23, hub 19, and shaft 27 along with the flapping hinge support arms 25 to which the rotor blades 15 through 18 are attached. The root or hub end of the blade 15

(shown by way of example, although this description applies to all four blades 15 through 18) is attached to the splined end of a shaft 42 of a pitch control motor 45, for rotation in either direction by the motor 45.

The pitch control motor 45 is a reversible electric motor supplied with operating power over leads 47 which extend through the hollow shaft 27 and the hollow control shaft 32 to a control unit associated with the engine generator 46 mounted within the fuselage 10 of the helicopter (FIG. 3). The control unit provides power through the leads 47 to operate the motor in either its foward or reverse direction; and the amount of current supplied also controls the speed of operation of the motors 45. Motors of this type and controls for effecting such variable speed bi-directional rotation of such motors are well known. The rotational angle or pitch aspect of the rotor blade 15 through 18 is effected by rotating the rotor blades about their longitudinal axis in bearings 43 by means of changing the rotational position of the shaft 42 of the individual pitch control motor 45 associated with each of the blades 15 through 18.

FIGS. 4 and 5 also illustrate the flapping hinge connection of the housing 35 for the motor 45 to permit the up and down movement of the rotor blades 15 to 18 by the pivoting the left end of the housing 35 (as viewed in FIGS. 4 and 5) about a bearing 53 mounted on a shaft 52 which passes through a generally U-shaped coupler 50 which is attached to the end of the arm 25 on which each rotor is mounted.

From a theoretical standpoint, rotation of the root end of the blades 15 through 18, as described in conjunction with FIGS. 4 and 5, should provide the proper pitch of the blades for the desired control. This, however, assumes that the blades 15 through 18 are relatively rigid and remain untwisted as they rotate. Early in helicopter development, this assumption was found to be correct only for low to moderate speeds if the airfoil is symmetrical about its chord, because for a symmetrical airfoil, the center of lift occurs one-quarter of the way back from the leading edge and does not move under different aerodynamic conditions. Consequently, if the feathering axis is at the quarter chord point, there will normally not be a twisting moment on the blade due to air flow. A cambered airfoil generally cannot be used in a helicopter for this reason. The assumptions about a symmetrical airfoil, however, become invalid at high and low speeds due to compressibility near Mach 1 and stall at low speeds. This fact limits the tip speed range for a helicopter. When the rotor blades twist, the helicopter becomes unstable.

To overcome the unstability which results from blade twisting, a twisting moment can be applied to the tips of the blades 15 through 18 if an electric motor connected to a rotating mass is mounted inside the blades 15 to 18 at the tips. This inherently is provided by the cross-flow fan and motor configuration of applicant's co-pending application Ser. No. 699,460 since the propulsion system for the blades of such a helicopter, include such a motor and rotating mass. Newton's laws explain that if momentum is added or subtracted to a mass rotating along the feathering axis, a corresponding reaction moment occurs on the motor, which can be used to apply a feathering moment to the blades at the tips. This moment can be used in conjunction with the mechanical root moment provided by the pitch control motor 45 to control both the blade feathering angle and twist.

Control of the twist to cause the tip path to be in accordance with the pitch established by the rotational position of the pitch control motor 45 may be provided by a control computer to correspondingly increase and decrease the rotational speed of the drive motor for the cross-flow fan propulsion system. The blade twist may be measured by different transducers, such as strain gauges along the blade length, a torson rod extending the length of the blade to an optical shaft encoded at the root end, or inertially by, in effect, using the reverse of the controlling system where a shaft encoder is mounted to a small fly wheel at the tip. Such a fly wheel tends to resist motion, so that the shaft encoder will register changes in pitch angle. The electric motor which is used to drive the cross-flow tip fan also may be used to provide this information by measuring the electric current powering the motor since this current changes slightly if the blade angle changes suddenly. It also is possible to control the tip angle or feathering of the blade in an "open loop" system where, once the characteristics of the rotor blade twist are known, a control computer can be used to supply the proper correctional information as a result of the rotational position of the blades under varying operating conditions.

The efficiency of the high speed helicopter which has been described in conjunction with FIGS. 1 through 5 also may be dramatically increased in high speed flight by the inclusion of a turbojet or propellor mounted at the rear of the fuselage 10. During high speed flight, this auxiliary turbojet or propellor provides the primary propulsion force. With such extra propulsion, the blade tip thrustors, such as the cross-flow fans of co-pending Ser. No. 699,460, need only enough power for hovering and take-off. As the speed of the helicopter increases, the blade rotation of the rotors 15 through 18 is accomplished by auto-rotation, both in the conventional sense of a normal autogyro on the advancing and lateral moving blades, and by reverse flow drag on the retreating blades. The air is reversed (that is the air approaches the trailing edge of the airfoil instead of the leading edge) over the retreating blades because the helicopter is moving forward faster than the backward speed of the retreating blades with respect to the fuselage 10. Consequently, the "backwards angle of attack" of the retreating blades is adjusted for no lift.

Various changes and modifications will occur to those skilled in the art without departing from the spirit and scope of this invention. The embodiment which is described above and which is shown in the drawings is to be considered illustrative only of the invention and not as limiting. For example, the principles of the invention also can apply to conventional shaft driven helicopters incorporating a tail rotor if desired. The invention is considered most practical when it is used with tip driven helicopters or air jet helicopters because of simpler design constraints on the machine and rotor assembly.

I claim:

1. In a single-rotor helicopter having fuselage, at least three rotor blades each having a hube end and a tip end, an offset flapping hub with an axis of rotation and to which the hub ends of the rotor blades are attached, and means for rotating the rotor blades to cause the rotor blades to advance on one side of the fuselage and to retreat on the other, an improvement including in combination;

a mast attached to said fuselage for mounting said hub above and offset past the retreating blade side of said fuselage;

means for cyclically individually controlling the pitch of each of said rotor blades as a function of the angular position of said blades with respect to said fuselage; and means for tilting said hub with respect to said mast independently of said means for individually controlling the pitch of each of said rotor blades, said tilting means including first control means for tilting said hub from side to side relative to the longitudinal axis of said fuselage and second control means for tilting said hub front to back in a line parallel with the longitudinal axis of said fuselage.

2. The combination according to claim 1 wherein said means for individually controlling the pitch of said rotor blades includes motors individually associated with each blade for rotating the corresponding blade about the longitudinal axis thereof.

3. The combination according to claim 2 wherein said motors are reversible electric motors.

4. The combination according to claim 3 wherein said means for controlling the pitch of each of said rotor blades causes said pitch to cyclically vary from a predetermined maximum to a predetermined minimum.

5. The combination according to claim 4 wherein said means for controlling the pitch of each of said rotor blades varies the pitch in a non-sinusoidal repeating cycle.

6. The combination according to claim 1 wherein said hub is mounted in a gimbel attached to and controlled by said first and second control means.

7. The combination according to claim 1 further including controllable torque extraction means attached to the axis of said hub.

8. The combination according to claim 7 wherein said torque extraction means is a generator.

9. The combination according to claim 1 wherein the location of said hub is a substantial distance beyond the retreating blade side of said fuselage.

10. The combination according to claim 1 wherein said means for controlling the pitch of each of said rotor blades causes said pitch to cyclically vary from a predetermined maximum to a predetermined minimum.

11. The combination according to claim 10 wherein said means for controlling the pitch of each of said rotor blades varies the pitch in a non-sinusoidal repeating cycle.

12. The combination according to claim 1 wherein said means for controlling the pitch of each of said rotor blades causes said pitch to cyclically vary from a predetermined maximum for advancing blades to a predetermined minimum for retreating blades.

13. The combination according to claim 12 wherein said means for individually controlling the pitch of said rotor blades includes motors individually associated with each blade for rotating the corresponding blade about the longitudinal axis thereof.

14. The combination according to claim 13 wherein said motors are reversible electric motors.

15. The combination according to claim 14 wherein said means for controlling the pitch of each of said rotor blades varies the pitch in a non-sinusoidal repeating cycle.

* * * * *